(12) United States Patent
Roessel et al.

(10) Patent No.: US 8,724,448 B2
(45) Date of Patent: May 13, 2014

(54) ENHANCED PHYSICAL DOWNLINK SHARED CHANNEL COVERAGE

(75) Inventors: Sabine Roessel, München (DE); Martin Goldberg, Greifenberg (JP); Frank Frederiksen, Klarup (DK); Jijun Luo, Munich (DE); Ulrich Rehfuess, München (DE); Jeroen Wigard, Klarup (DK)

(73) Assignee: Nokia Siemens Networks Oy, Espoo (FI)

( * ) Notice: Subject to any disclaimer, the term of this patent is extended or adjusted under 35 U.S.C. 154(b) by 0 days.

(21) Appl. No.: 13/381,759

(22) PCT Filed: Jul. 3, 2009

(86) PCT No.: PCT/EP2009/058463
§ 371 (c)(1),
(2), (4) Date: Mar. 12, 2012

(87) PCT Pub. No.: WO2011/000441
PCT Pub. Date: Jan. 6, 2011

(65) Prior Publication Data
US 2012/0163319 A1 Jun. 28, 2012

(51) Int. Cl.
*H04J 11/00* (2006.01)

(52) U.S. Cl.
USPC ..................... 370/208; 375/240.24

(58) Field of Classification Search
USPC ......... 370/204, 203, 208, 319, 230, 335, 342, 370/344, 349, 310.2; 375/240.24
See application file for complete search history.

(56) References Cited

U.S. PATENT DOCUMENTS

| | | | |
|---|---|---|---|
| 8,073,062 B2 * | 12/2011 | Classon et al. | 375/260 |
| 2007/0242636 A1 * | 10/2007 | Kashima et al. | 370/329 |
| 2010/0208673 A1 * | 8/2010 | Nam et al. | 370/329 |

FOREIGN PATENT DOCUMENTS

| | | |
|---|---|---|
| EP | 2 007 058 A1 | 12/2008 |
| WO | WO 2008/129379 A2 | 10/2008 |

OTHER PUBLICATIONS

Baker et al.: Chapter 9, Downlink Physical Data and Control Channels, Jan. 1, 2009, LTE—The UMTS Long Term Evolution: From Theory to Practice, Chichester: Wiley, GB, pp. 181-206, XP002576365, ISBN: 9780470697160, Retrieved from the Internet: URL: http://www3.interscience.wiley.com/cgi-bin/booktext/122204705/BOOKPDFSTA [retrieved on Apr. 1, 2010].

(Continued)

*Primary Examiner* — Brenda H Pham
(74) *Attorney, Agent, or Firm* — Harrington & Smith

(57) ABSTRACT

An apparatus is provided, including an observing function configured to observe an indication about the coverage status of a user equipment; a deciding function configured to decide, based on the indication, to switch into a coverage extension mode; a providing function configured to provide a scaling number in dependence of the coverage extension mode; an allocating function configured to allocate, for data to be transmitted to a user equipment, a first modulation and coding scheme, a first modulation order, a first size of a transport block, and a first number of resource blocks per transport block according to an orthogonal frequency division multiplexing technology, a reducing function configured to reduce a first size per resource block, being the quotient of the first size of the transport block and the first number of resource blocks per transport block, based on the scaling number, thus obtaining a second size per resource block, being the quotient of a second size of the transport block and a second number of resource blocks per transport block; and a scheduling function configured to schedule, for the data, the second size of the transport block and the second number of resource blocks per transport block.

27 Claims, 6 Drawing Sheets

(56) References Cited

OTHER PUBLICATIONS

3GPP TS 36.104 V8.5.0 (Mar. 2009), 3rd Generation Partnership Project; Technical Specification Group Radio Access Network; Evolved Universal Terrestrial Radio Access (E-UTRA); Base Station (BS) radio transmission and reception (Release 8), (74 pages).

3GPP TS 36.213 V8.7.0 (May 2009), "3rd Generation Partnership Project; Technical Specification Group Radio Access Network; Evolved Universal Terrestrial Radio Access (E-UTRA); Physical layer procedures (Release 8)", 77 pages.

3GPP TS 36.212 V8.7.0 (May 2009), 3rd Generation Partnership Project; Technical Specification Group Radio Access Network; Evolved Universal Terrestrial Radio Access (E-UTRA);Multiplexing and channel coding (Release 8), (60 pages).

* cited by examiner

ENHANCED PHYSICAL DOWNLINK SHARED CHANNEL COVERAGE

FIELD OF THE INVENTION

The present invention relates to an apparatus, a method, a system, and a computer program product for enhancing the coverage of a physical downlink shared channel.

BACKGROUND OF THE INVENTION

The 3GPP standard Long-Term-Evolution (LTE) of UTRAN is a system using orthogonal frequency division multiplex (OFDM) standards with frequency-localized allocations.

In the LTE system one main difference to earlier 3GPP releases is the use of wide channels that are shared with users in frequency domain (i.e., frequency division multiplexing). Allocation for one user can vary from one physical resource block (PRB) to maximum number of resource blocks in the channel (e.g. 50 PRB for 10 MHz channel). A physical resource block is the smallest allocable frequency range of the uplink or downlink frequency band lasting a predefined time. E.g., in LTE, a physical resource block is 180 kHz wide and lasts for a 0.5 ms time slot.

LTE may have to be capable of substituting incumbent radio access technologies including Code Division Multiplex Access (CDMA), Wideband CDMA (W-CDMA), and Global System for Mobile communication (GSM)/Enhanced Data rate for GSM Evolution (EDGE) where spectrum allocations and regulatory rules will allow for.

It is therefore of vital interest to operators, that migration e.g. from CDMA or from W-CDMA to LTE is possible without the need for further increasing the number of Base Station sites or the amount or size of antenna configurations.

Hence, for the same traffic profile and demand, LTE link budgets shall match those of CDMA or W-CDMA. Further, LTE link budgets matching conventional traffic profiles and demand must also match LTE link budgets for new applications like down streaming or heavy downloading.

The LTE downlink (DL) link budget is critical for the Physical Downlink Shared Channel (PDSCH) with high data rate services like video or multi-media streaming (e.g. ½ Mbps at the cell edge), and for low data rate services like voice over internet protocol (VoIP) (e.g. 5.9 Kbps or 12.2/12.8 Kbps) at the cell edge.

A straight forward method of improving the LTE DL link budget is to allocate as many PRBs for a critical user equipment (UE)/service as possible and to employ an as robust as possible Modulation and Coding Scheme (MCS). In current Rel'8 scope, this is handled by using the lowest possible transport block size index (TBS index). The TBS index is given from the modulation order and the MCS. The mapping from TBS index to transport block size is given in 3rd generation partnership project (3GPP) technical specification (TS) 36.213, section 7.1.7. A transport block (TB) is defined as data accepted by the physical layer to be jointly encoded.

FIG. 1 shows the maximum number of physical resource blocks (PRB) in dependence of the number of information bits in a transport block according to 3GPP specification 36.213, v8.7.0. The curve is given for the smallest Modulation and Coding Scheme (MCS, transport block size index=0) as it is the most robust MCS and, thus, appropriate for extending the limits of the downlink link budget.

As shown in FIG. 1, the number of PRBs that can be allocated at maximum for a given size of the Transport Block and a given Modulation and Coding Scheme (MCS) is limited and may not reach the full LTE DL bandwidth. From this it is seen that in LTE Release 8, it is not possible to transmit with full DL bandwidth a single low data rate service.

An alternative method of improving the LTE downlink link budget is to "borrow" energy from PRBs that are using less than the nominal enhanced NodeB (eNB) transmission power or are not used at all. This means that we can potentially lower the power allocated to non-critical UEs and/or services. This borrowing is specified and can be at most 3 dB up and at most 6 dB down for PDSCH (see 3GPP TS 36.104 v8.5.0, Section 6.3.1.1).

Generally, such resource element (RE) power boosting will only work, if not all of the PRBs are allocated to the critical UE/service already; otherwise there is no resource to borrow power from.

SUMMARY OF THE INVENTION

It is an object of the present invention to improve the prior art.

According to a first aspect of the invention, there is provided 1 an apparatus, comprising observing means configured to observe an indication about the coverage status of a user equipment; deciding means configured to decide, based on the indication, to switch into a coverage extension mode; providing means configured to provide a scaling number in dependence of the coverage extension mode; allocating means configured to allocate, for data to be transmitted to a user equipment, a first modulation and coding scheme, a first modulation order, a first size of a transport block, and a first number of resource blocks per transport block according to an orthogonal frequency division multiplexing technology, reducing means configured to reduce a first size per resource block, being the quotient of the first size of the transport block and the first number of resource blocks per transport block, based on the scaling number, thus obtaining a second size per resource block, being the quotient of a second size of the transport block and a second number of resource blocks per transport block; and scheduling means configured to schedule, for the data, the second size of the transport block and the second number of resource blocks per transport block.

Modifications of the first aspect are as follows:

In the apparatus, the reducing means may be configured to divide the first size of the transport block by the scaling number to obtain the second size of the transport block.

In the apparatus, the reducing means may be configured to multiply the first number of resource blocks per transport block with the scaling number to obtain the second number of resource blocks per transport block.

In the apparatus, the indication may be a link quality of the user equipment.

The apparatus may further comprise transmitting means configured to transmit an information about the coverage extension mode.

In the apparatus the transmitting means may be configured to transmit the information via radio resource control signaling.

In the apparatus, the transmitting means may be configured to transmit the indication.

Furthermore, it is provided a base station, comprising an apparatus according to the first aspect, and a base station means configured to provide a base station functionality according to the orthogonal frequency division multiplexing technology.

According to a second aspect of the invention, there is provided an apparatus, comprising extracting means configured to extract, for a sequence of resource blocks, a scaling number, a modulation and coding scheme, a first modulation order, a first size of a transport block, and a first number of resource blocks per transport block according to an orthogonal frequency division multiplexing technology; reducing means configured to reduce a first size per resource block, being the quotient of the first size of the transport block and the first number of resource blocks per transport block, based on the scaling number, thus obtaining a second size per resource block, being the quotient of a second size of the transport block and a second number of resource blocks per transport block; and assigning means configured to assign the second size of the transport block and the second number of resource blocks to the sequence of resource blocks.

Modifications of the second aspect are as follows:

In the apparatus, the reducing means may be configured to divide the first size of the transport block by the scaling number to obtain the second size of the transport block.

In the apparatus, the reducing means may be configured to multiply the first number of resource blocks per transport block with the scaling number to obtain the second number of resource blocks per transport block.

The apparatus may further comprise receiving means configured to receive an information about the scaling number.

In the apparatus, the receiving means ma be configured to receive the information via radio resource control signaling.

Furthermore, there is provided a user equipment, comprising an apparatus according to the second aspect, and a user equipment means configured to provide a user equipment functionality according to the orthogonal frequency division multiplexing technology.

According to a third aspect of the invention, illustrated by FIG. 6, there is provided a method, comprising observing 602 an indication about the coverage status of a user equipment; deciding 604, based on the indication, to switch into a coverage extension mode;

providing 606 a scaling number in dependence of the coverage extension mode; allocating 608, for data to be transmitted to a user equipment, a first modulation and coding scheme, a first modulation order, a first size of a transport block, and a first number of resource blocks per transport block according to an orthogonal frequency division multiplexing technology; reducing 610 a first size per resource block, being the quotient of the first size of the transport block and the first number of resource blocks per transport block, based on the scaling number, thus obtaining a second size per resource block, being the quotient of a second size of the transport block and a second number of resource blocks per transport block; and scheduling 612, in the coverage extension mode, for the data, the second size of the transport block and the second number of resource blocks per transport block.

Modifications of the third aspect are as follows:

In the method, the reducing may be performed by dividing the first size of the transport block by the scaling number to obtain the second size of the transport block.

In the method, the reducing may be performed by multiplying the first number of resource blocks per transport block with the scaling number to obtain the second number of resource blocks per transport block.

In the method, the indication may be a link quality of the user equipment.

The method may further comprise transmitting an information about the coverage extension mode.

In the method, the transmitting may be performed by transmitting the information via radio resource control signaling.

In the method, the transmitting means may be performed by transmitting the indication.

The method may be a method of extending a downlink shared channel coverage.

According to a fourth aspect of the invention, illustrated by FIG. 7, there is provided a method, comprising extracting 702, for a sequence of resource blocks, a scaling number, a modulation and coding scheme, a first modulation order, a first size of a transport block, and a first number of resource blocks per transport block according to an orthogonal frequency division multiplexing technology; reducing 704 a first size per resource block, being the quotient of the first size of the transport block and the first number of resource blocks per transport block, based on the scaling number, thus obtaining a second size per resource block, being the quotient of a second size of the transport block and a second number of resource blocks per transport block; and assigning 706 the second size of the transport block and the second number of resource blocks to the sequence of resource blocks.

Modifications of the fourth aspect are as follows:

In the method, the reducing may be performed by dividing the first size of the transport block by the scaling number to obtain the second size of the transport block.

In the method, the reducing may be performed by multiplying the first number of resource blocks per transport block with the scaling number to obtain the second number of resource blocks per transport block.

The method may further comprise receiving an information about the scaling number.

In the method, the receiving may be performed by receiving the information via radio resource control signaling.

The method may be a method of extending a downlink shared channel coverage.

According to a fifth aspect of the invention, there is provided a computer program product embodied on a computer-readable medium, comprising program instructions which perform, when run on a computer, the execution of which result in operations of the method according to the third aspect or the fourth aspect of the invention.

According to a sixth aspect of the invention, there is provided a system comprising, an apparatus according to the first aspect, wherein the user equipment is an apparatus according to the second aspect.

According to a seventh aspect of the invention, there is provided 1 an apparatus, comprising observer configured to observe an indication about the coverage status of a user equipment; decider configured to decide, based on the indication, to switch into a coverage extension mode; provider configured to provide a scaling number in dependence of the coverage extension mode; allocater configured to allocate, for data to be transmitted to a user equipment, a first modulation and coding scheme, a first modulation order, a first size of a transport block, and a first number of resource blocks per transport block according to an orthogonal frequency division multiplexing technology, reducer configured to reduce a first size per resource block, being the quotient of the first size of the transport block and the first number of resource blocks per transport block, based on the scaling number, thus obtaining a second size per resource block, being the quotient of a second size of the transport block and a second number of resource blocks per transport block; and scheduler configured to schedule, for the data, the second size of the transport block and the second number of resource blocks per transport block.

Modifications of the seventh aspect are as follows:

In the apparatus, the reducer may be configured to divide the first size of the transport block by the scaling number to obtain the second size of the transport block.

In the apparatus, the reducer may be configured to multiply the first number of resource blocks per transport block with the scaling number to obtain the second number of resource blocks per transport block.

In the apparatus, the indication may be a link quality of the user equipment.

The apparatus may further comprise transmitter configured to transmit an information about the coverage extension mode.

In the apparatus, the transmitter may be configured to transmit the information via radio resource control signaling.

In the apparatus, the transmitter may be configured to transmit the indication.

Furthermore, it is provided a base station, comprising an apparatus according to the first aspect, and a base station processor configured to provide a base station functionality according to the orthogonal frequency division multiplexing technology.

According to an eighth aspect of the invention, there is provided an apparatus, comprising extractor configured to extract, for a sequence of resource blocks, a scaling number, a modulation and coding scheme, a first modulation order, a first size of a transport block, and a first number of resource blocks per transport block according to an orthogonal frequency division multiplexing technology; reducer configured to reduce a first size per resource block, being the quotient of the first size of the transport block and the first number of resource blocks per transport block, based on the scaling number, thus obtaining a second size per resource block, being the quotient of a second size of the transport block and a second number of resource blocks per transport block; and assigner configured to assign the second size of the transport block and the second number of resource blocks to the sequence of resource blocks.

Modifications of the eighth aspect are as follows:

In the apparatus, the reducer may be configured to divide the first size of the transport block by the scaling number to obtain the second size of the transport block.

In the apparatus, the reducer may be configured to multiply the first number of resource blocks per transport block with the scaling number to obtain the second number of resource blocks per transport block.

The apparatus may further comprise a receiver configured to receive an information about the scaling number.

In the apparatus, the receiver may be configured to receive the information via radio resource control signaling.

Furthermore, there is provided a user equipment, comprising an apparatus according to the eighth aspect, and a user equipment processor configured to provide a user equipment functionality according to the orthogonal frequency division multiplexing technology.

It is to be understood that any of the above modifications can be applied individually or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, in which.

DETAILED DESCRIPTION OF CERTAIN EMBODIMENTS

Figure 1:
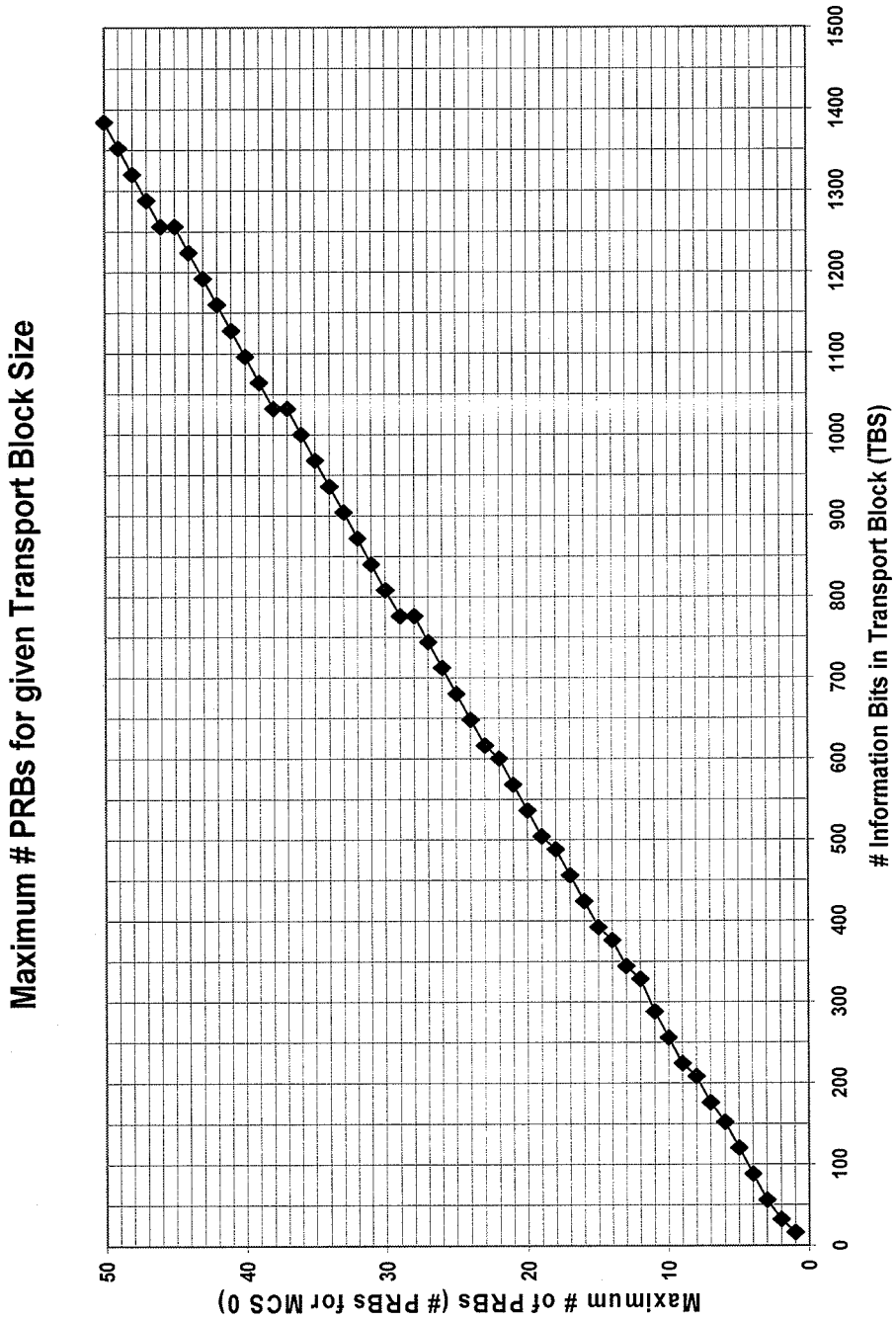
FIG. 1 shows the maximum number of physical resource blocks (PRB) in dependence of the number of information bits in a transport block.

Herein below, certain embodiments of the present invention are described in detail with reference to the accompanying drawings, wherein the features of the embodiments can be freely combined with each other unless otherwise described.

However, it is to be expressly understood that the description of certain embodiments is given for by way of example only, and that it is by no way intended to be understood as limiting the invention to the disclosed details.

Moreover, it is to be understood that the apparatus is configured to perform the corresponding method, although in some cases only the apparatus or only the method are described.

The present application focuses on enhancing the DL link budget of the Physical Downlink Shared Channel (PDSCH).

It is disclosed a coverage extension method for the LTE Physical Downlink Shared Channel (PDSCH) in order to catch up with a Downlink link budget of existing W-CDMA deployments—in particular for low rate services such as VoIP.

The basic idea comprises optimally enhancing the energy over noise per information bit per UE by reducing the number of information bits per Physical Resource Block (PRB). This may be achieved in at least two ways: The number of PRBs per transport block (TB) may be enhanced, or the number of information bits per transport block may be reduced.

The limit for extending the downlink (DL) link budget of the Physical Downlink Shared Channel (PDSCH) would be the limit of the (DL) link budget of the Physical Downlink Control Channel (PDCCH) and—probably even worse—the limit of the uplink (UL) link budget in case of symmetric services like Voice over Internet Protocol (VoIP).

In some embodiments, LTE Release 8 supported PRB allocation sizes are traded off against factoring the PRB allocation size up for a single cell edge user (such that the DL link budget can be stretched beyond the conventional capabilities).

The number of information bits in a transport block, the Modulation and Coding Scheme (MCS), and the number of physical resource blocks (PRB) for a time transmission interval (TTI) of a communication with a user equipment (UE) are usually set in the MAC layer, controlled by a scheduler, according to the relevant communication standard, as e.g. outlined in the transport block size (TBS) table according to section 7.1.7.2 of 3GPP TS 36.213.

In some embodiments, in addition, a scaling factor ("DL_TBS_scaling_factor") may be taken into account. According to the scaling factor, the number of PRBs for a transmission of the same amount of user information bits may be enhanced over the regular value according to the standard. Thus, more energy per information bit is available for this transmission, and, the coverage may be extended.

For example, an allocation of 12 PRBs, TBS index "0" may carry, according to the TBS tables in 3GPP TS 36.213, section 7.1.7, 328 information bits per transport block in a TTI, which should be able to carry a 12.8 Kbps VoIP packet (including headers). If DL_TBS_scaling_factor is set to 2, instead of 12 PRBs, the scheduler will allocate 24 PRBs to the transmission. With this effective doubling of the radio resources by a factor of 2, the circular buffer rate matcher will provide a much lower code rate compared to the 24 PRB allocation without scaling (effective code rate is changed from 1/9 to 1/18). This will provide a theoretical gain in the signal to interference-plus-noise ratio (SINR) requirements of 3 dB. This effectively increases the energy over noise per information bit, or in other words, lowers the code rate and hence "robustifies" the encoding for an extension of the link budget.

In some embodiments, depending on the LTE bandwidth, it might be reasonable to have DL_TBS_scaling_factors of up to 8. For simplicity, scaling factors of 1, 2, 4, and 8 (generally: $2^n$) may be used. This will provide sufficient flexibility for all bandwidths on top of the flexibility given from the TBS index vs. PRB table, as e.g. the transport block size table according to 3GPP TS 36.213, section 7.1.7.2.

Usually, the default scaling factor is 1, corresponding to the conventionally standardized behavior.

In some embodiments, if the eNodeB recognizes that the DL link budget of a UE/service is exhausted, it may apply a DL_TBS_scaling_factor larger than 1 for the corresponding UE/service. For example, if a user equipment requires a service (e.g. VoIP) with a minimum DL data rate, whereas, on the other hand, the scheduler would like to reduce the DL data rate below this minimum data rate because of poor radio conditions, the link budget is exhausted.

The scaling factor may be set once for a longer time, or it may be determined for each TTI. Further, it may be set on a per-UE basis.

The DL_TBS_scaling_factor is preferably given via radio resource control (RRC) signalling to the user equipment because it seems to be one of the most robust signalling methods for providing this information. However, other signalling methods may be envisioned. E.g., if the user is moving fast such that the radio conditions change frequently, the DL_TBS-scaling factor may be transmitted through physical layer signaling when needed.

If the DL_TBS_scaling_factor is set to 1, the UE is driven in LTE Release 8 compliant mode. In this case, TBS-over-PRB tables and encoding/decoding are applied as standardized in LTE Release 8, 36.213, section 7.1.7. Depending on the circumstances, the user equipment may then not be supported at the outermost zones of the extended cell.

The following services are examples of services taking benefit from extending the range of the PDSCH to the limits (assuming that with appropriate methods not covered in this application the Uplink link budget can be extended to the same extent):
  12.8 Kbps VoIP
  5.9 Kbps VoIP
  Moderate streaming of up to 1 Mbps Basically, any instantaneous data rate that is in the "upper triangle" of FIG. 1 would potentially be a candidate for this coverage enhancing method. A user/service with a DL_TBS_scaling_factor larger than 1 requires more bandwidth by a factor of the DL_TBS_scaling_factor, which may in some cases be scheduled at the cost of the bandwidth available for other users/services.

The following table 1 illustrates the PDSCH coverage extensions caused in some embodiments by switching on DL_TBS_scaling_factor values larger than 1. The TBS index is defined according to table 7.1.7.1-1 of 3GPP TS 36.212 v8.7.0, and depends on the MCS index and the modulation order. In the cases illustrated in table 1, the modulation order is 2, i.e. the TBS index corresponds to the MCS index.

Column "Extrapolated link budget gain (dB)" shows the link budget gain (in dB) compared to the best possible coverage with respect to LTE Release 8 capabilities obtained by extrapolating from a comprehensive set of simulated SNIR values towards lower code rates.

The extrapolated link budget gains are conservative; the (theoretical) upper limit to the link budget gain in decibel shown in column "Upper limit for link budget gain (dB)" is given as $10*\log_{10}$ (allocated PRBs with scaling/allocated PRBs without scaling). It does not take into account the effect of different TBS indices. Further simulations may reveal where in the range between the conservative and theoretical upper limit actual link budget gains will be.

It is likely that optimizations of the PDCCH and the PUSCH cell ranges are required for values of the DL_TBS_scaling_factor of 4 and 8; on the other hand, the PDCCH and PUSCH cell ranges for a DL_TBS_scaling_factor of 2 are likely to be balanced with the optimization.

TABLE 1

VoIP 12.8 Kbps DL link budget optimization based on allocation factor enhancements

| VoIP: 12.8 Kbps Packet size: 328 bits | LTE Release 8 supported TB size (# PRBs) | TBS index | DL_TBS_scaling_factor | (Re-) transmissions | Extrapolated link budget gain (dB) | Upper limit for link budget gain (dB) |
|---|---|---|---|---|---|---|
| Release 8 | 12 | 0 | 1 | 1 | | |
| Extension proposal | 12 | 0 | 2 | 1 | 2.5 | 3 |
| Extension proposal | 12 | 0 | 4 | 1 | 4 | 6 |
| Extension proposal | 8 | 2 | 8 | 1 | 4.2 | 7.26 |

As can be seen from the last line in table 1, the introduction of the scaling factor offers a further option for the scheduler in some embodiments.

The bandwidth required by the single UE/service with DL_TBS_scaling_factor=8 and TBS index=0 would be 8*12=96 PRBs, which may be not acceptable in some cases. If, however, a DL_TBS_scaling_factor=4 and TBS index=0 is not sufficient to serve the UE/service, the scheduler may try a combination of a higher TBS index with a higher DL_TBS_scaling_factor. Although transmission may be less robust because of the higher TBS index, the larger bandwidth may overcompensate this loss. In the case of table 1, a transport block size of 328 information bit and TBS index=2, 8 PRBs may be scheduled without scaling. With DL_TBS_scaling_factor=8, 64 PRBs may be allocated to the transmission.

According to our simulations, a gain of 4.21 dB may be achieved, which is larger than the gain of 3.98 dB for DL_T-BS_scaling_factor=4 and TBS index=0.

Figure 2:
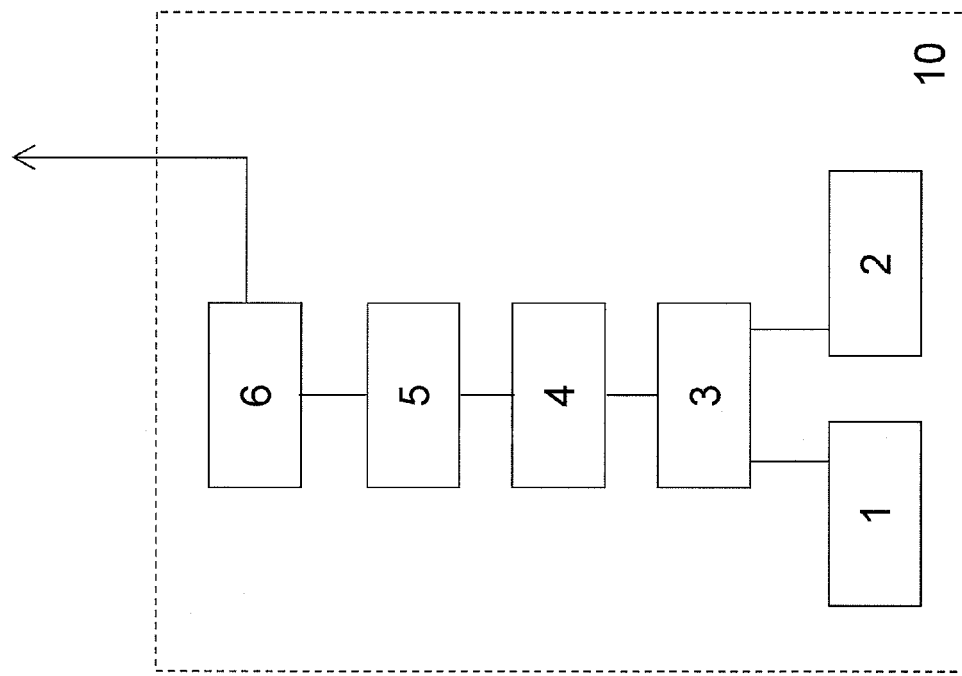
FIG. 2 shows an apparatus according to an embodiment of the invention.
Figure 4:
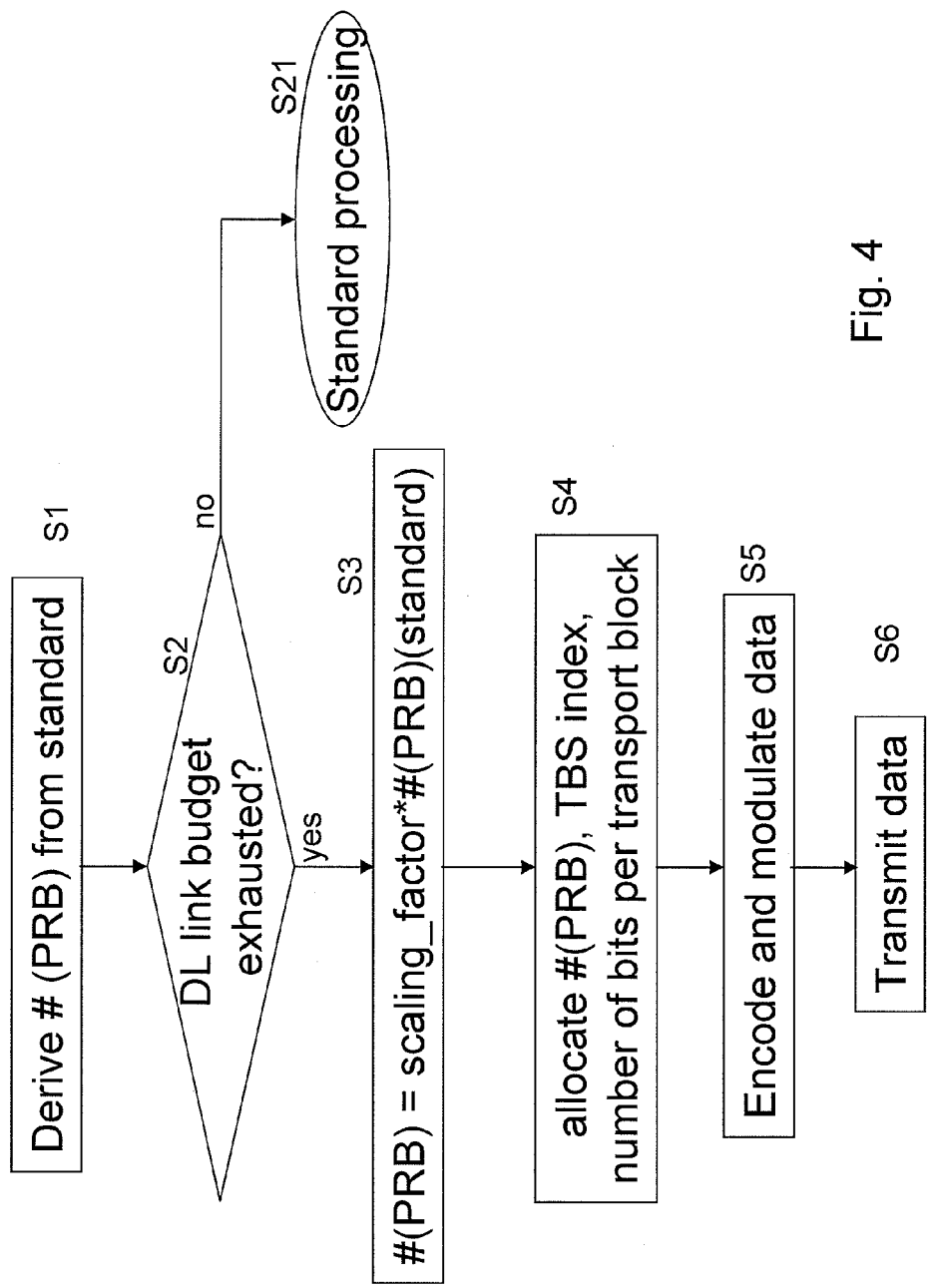
FIG. 4 shows a method according to an embodiment of the invention.

FIG. 2 shows an apparatus 10 according to embodiment of the present invention which may be incorporated e.g. in an eNodeB. FIG. 4 shows a method according to an embodiment of the invention. Since the method of FIG. 4 may be performed by the apparatus of FIG. 2, both, the method and the apparatus are jointly explained. However, it is to be understood, that the method explained is not the only method to be performed by the apparatus, and the apparatus is not the only apparatus to perform the method.

The apparatus 10 comprises a deriver 1, a decider 2, an obtainer 3, an allocator 4, an encoder 5, and a transmitter 6.

In the deriver 1, a number of resource blocks to be allocated to a transmission to a user equipment is derived based on the OFDM standard (S1). The number depends on the modulation and coding scheme, the modulation order, and the number of information bits per transport block. This number is the minimum number of allocated resource blocks for the given combination of modulation and coding scheme, the modulation order, and the number of information bits per transport block.

In the decider 2, it is decided whether or not a downlink link budget of the user equipment is exhausted (S2). If the DL link budget is not exhausted, the method proceeds according to standard procedure, i.e. the number of allocated resource blocks is equal to the according to the OFDM technology (S21).

If the DL budget is exhausted, a first number being larger than the number of allocated resource blocks according to the OFDM technology is obtained in the obtainer 3 (S3). In some embodiments, the first number may be obtained by multiplying the number according to the standard with a scaling factor, i.e. an integer larger than 1. Furthermore, in some embodiments, the standard processing according to step S21 may be performed by setting the scaling factor equal to 1.

In the allocator 4, the first number is allocated to the user equipment, together with the modulation and coding scheme, the modulation order, and the number of information bits per transport block (S4). In the encoder 5, the data to be transmitted to the user equipment are encoded and modulated using the modulation and coding scheme and the modulation order (S5).

The transmitter 6 transmits the encoded and modulated data to the user equipment using the OFDM interface (S6). Furthermore, the transmitter 6 may transmit jointly or separately an information about the number of PRBs allocated per transport block. Favorably, the scaling factor is transmitted. Also, the transmitter transmits, jointly or separately, information about three of the four parameters MCS, modulation order, number of information bits per transport block, and number of PRBs per transport block according to the OFDM standard.

Figure 3:
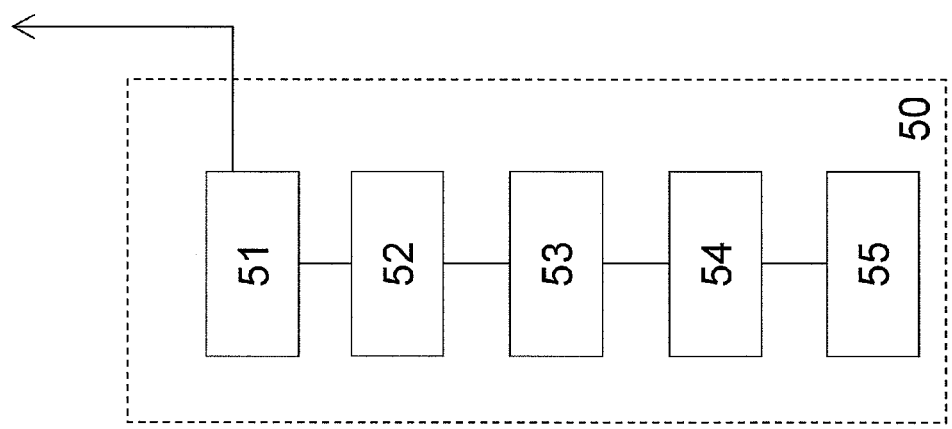
FIG. 3 shows another apparatus according to an embodiment of the invention.
Figure 5:
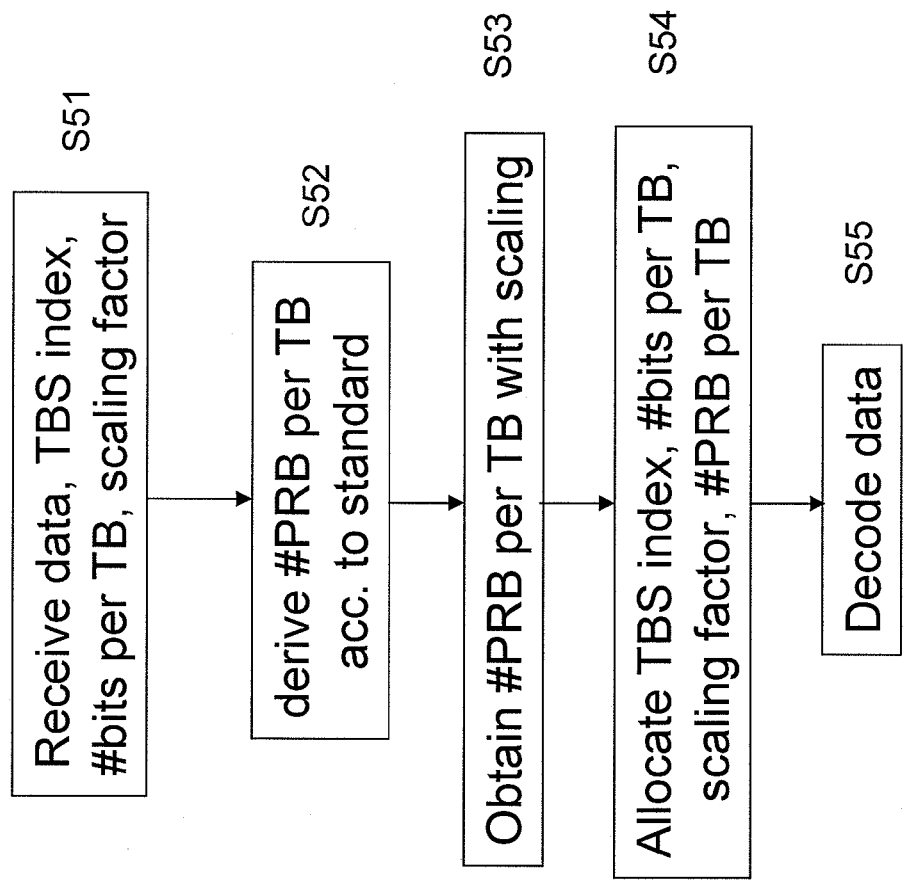
FIG. 5 shows another method according to an embodiment of the invention.
Figure 6:
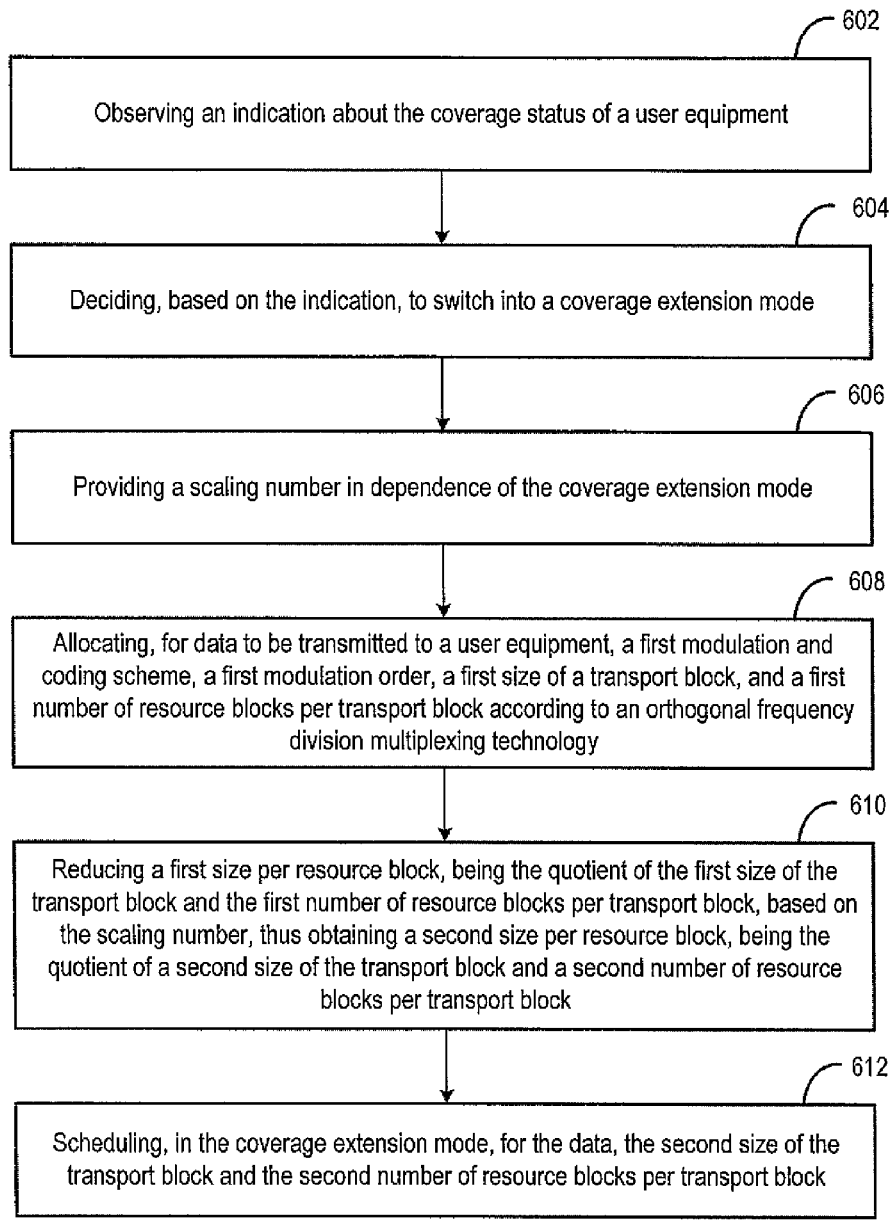
FIG. 6 shows another method according to an embodiment of the invention.
Figure 7:
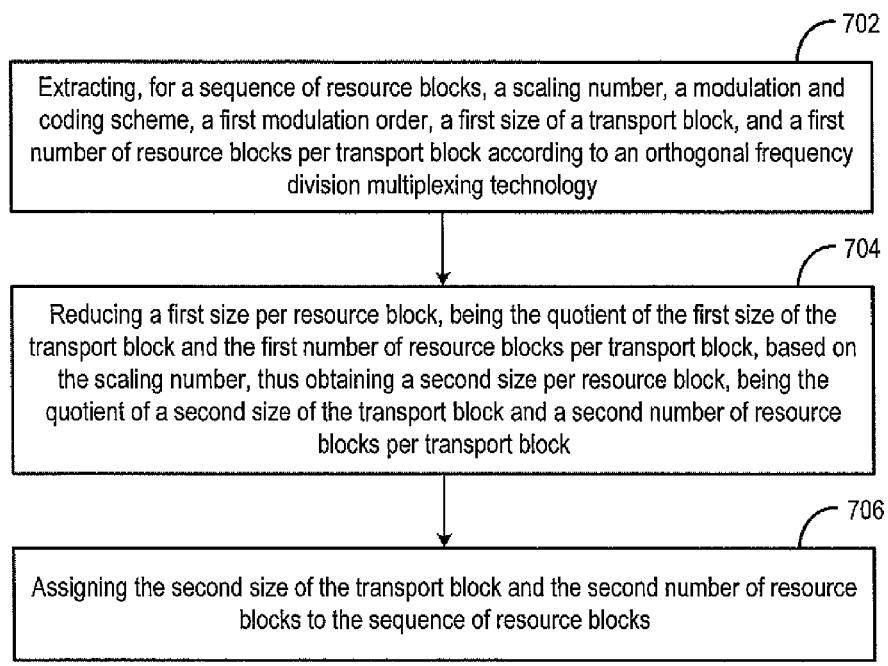
FIG. 7 shows yet another method according to an embodiment of the invention.

FIG. 3 shows another apparatus 50 according to embodiment of the present invention which may be incorporated e.g. in a user equipment. FIG. 5 shows another method according to an embodiment of the invention. Since the method of FIG. 5 may be performed by the apparatus of FIG. 3, both, the method and the apparatus are jointly explained. However, it is to be understood, that the method explained is not the only method to be performed by the apparatus, and the apparatus is not the only apparatus to perform the method.

The apparatus 50 comprises a receiver 51, a deriver 52, an obtainer 53, an allocator 54, and a decoder 55.

A sequence of PRBs comprising data and an information about a corresponding MCS, modulation order and number of information bits per transport block is received by the receiver 51 (S51). Furthermore, jointly or separately, an information about a scaling factor is received.

The deriver 52 derives from the information a number of PRBs per transport block according to the OFDM standard (S52).

Alternatively, in other embodiments, an information about any three of the four parameters MCS, modulation order, number of information bits per transport block, and number of PRBs per transport block according to the OFDM standard is received, and the fourth parameter is derived by the deriver 52.

In the obtainer 53, the number of PRBs per transport block is obtained by multiplying the number of PRB according to the OFDM standard with the scaling factor (S53). The allocator 54 allocates the MCS, modulation order, number of information bits per transport block, and number of PRBs per transport block to the received sequence of PRBs comprising data (S54).

Using the allocated parameters, the sequence of resource blocks is demodulated and decoded in the decoder 55 (S55).

The modules shown for the two exemplary embodiments in FIGS. 2 and 3 may be separate modules, or some or all of the modules may be implemented in one module. The modules may be implemented in software, firmware, hardware, or a combination thereof.

In some embodiments, the method is based on LTE Release 8 backward-compatible modifications to the LTE standard. These modifications may be added to the standard in LTE Release 9 or LTE-Advanced (LTE Release 10) latest.

In some embodiments, the method may be applied to other OFDM-based wireless access communication techniques or standards than of E-UTRAN/LTE mobile communication.

In some embodiments, instead of the scaling factor, a number may be added to the number of PRBs per transport block according to the standard. In general, any mathematical operation feasible to increase a positive integer to a larger positive integer may be used.

However, using a scaling factor with values of $2^n$ as explained above has the advantage that the "DL_TBS_scaling_factor" is an elegant way of effectively lowering the code rate while keeping the implementation efforts minimal in the eNodeB and in the UE in particular. In some embodiments, the rate matcher is based on a virtual circular buffer which can be easily extended for repetitive output in accordance to the DL_TBS_scaling_factor of 2, 4, or 8.

In some embodiments, DL link exhausting may be monitored by a network monitoring system.

Further indications of an exhaustion of a downlink link budget may be e.g. a poor channel quality indication (CQI), or a low received signal strength indication (RSSI).

In addition, in some embodiments, for cases, where the link budget is exhausted for services with a minimum DL data rate, the scaling factor may also be applied to extend the coverage for "best effort" services, where no minimum data rate is guaranteed. In these cases, when the user is at or beyond the border of the coverage area with a scaling factor of 1, the service may still be available when the scaling factor is enhanced.

In some embodiments, further gain can be obtained from scheduling flexibility when combining a reasonable DL_TBS_scaling_factor in a large LTE bandwidth with hybrid automatic repeat request (HARQ). As the disclosed method only addresses the interpretation of the TBS index, any HARQ operation will not be impacted by this change. The same applies to any power boosting mechanisms that may be used to further extend the coverage.

In some cases, using DL_TBS_scaling_factor for DL link budget extension may be advantageous for Semi-Persistent Scheduling (SPS) cases where spending resources in the frequency domain may be less conflicting with SPS than HARQ.

While the use of the DL_TBS_scaling_factor for data on the PDSCH shall preferably be configured via RRC per UE, in some embodiments the System Information Block (SIB) being mapped to the PDSCH may be extended in coverage as well. This may be advantageous e.g. if an aggressive network deployment requires a far reach of the common signalling information.

In some embodiments, the scaling factor "DL_TBS_scaling_factor" may be taken into account to reduce the number of information bits scheduled per transport block. As described above, the transport blocks are segmented usually in the MAC layer. In these embodiments, the number of PRBs per transport block in a TTI is kept constant. Therefore, the coverage is extended by increasing the energy per information bit at the cost of a reduced data rate to the UE.

As an example, it is assumed that, in the MAC layer, a TBS index of 0, and an allocation of 24 PRBs per transport block are scheduled without taking into account the scaling factor. According to 3GPP TS 36.213 v8.7.0, section 7.1.7.2, the size of a transport block is 648 information bits. If a scaling factor of 2 is taken into account, the size of the transport block is 648/2=324 information bits. I.e., the data rate to the UE is reduced from 648 information bits per TTI to 324 information bits per TTI.

Note that the size of each transport block of 324 information bits is close to (but not identical with) 328 information bits, which is scheduled for TBS index of 0 and 12 PRBs per TTI. From this perspective, the effect of reducing the number of information bits per transport block (keeping the number of PRBs per TB constant) is similar to enhancing the number of PRBs per transport block (keeping the scheduled size of a transport block constant).

In still further embodiments, the scaling factor may be taken into account for scaling the number of information bits per transport block as well as for scaling the number of PRBs per transport blocks. Furthermore, different scaling factors may be used for each of these methods.

In some embodiments, the scaling factor may be implemented in additional tables with the correlation of modulation order, MCS, number of information bits per transport block, and number of PRBs per transport block.

According to the above description, it should thus be apparent that exemplary embodiments of the present invention provide, for example an evolved Node B, or a component thereof, an apparatus embodying the same, a method for controlling and/or operating the same, and computer program(s) controlling and/or operating the same as well as mediums carrying such computer program(s) and forming computer program product(s).

For example, described above are apparatuses, methods, system and computer program products capable of extending the coverage of the physical downlink shared channel.

In particular, it is provided an apparatus, comprising observing means configured to observe an indication about the coverage status of a user equipment; deciding means configured to decide, based on the indication, to switch into a coverage extension mode; providing means configured to provide a scaling number in dependence of the coverage extension mode; allocating means configured to allocate, for data to be transmitted to a user equipment, a first modulation and coding scheme, a first modulation order, a first size of a transport block, and a first number of resource blocks per transport block according to an orthogonal frequency division multiplexing technology; reducing means configured to reduce a first size per resource block, being the quotient of the first size of the transport block and the first number of resource blocks per transport block, based on the scaling number, thus obtaining a second size per resource block, being the quotient of a second size of the transport block and a second number of resource blocks per transport block; and scheduling means configured to schedule, for the data, the second size of the transport block and the second number of resource blocks per transport block.

Furthermore, it is provided an apparatus, comprising extracting means configured to extract, for a sequence of resource blocks, a scaling number, a modulation and coding scheme, a first modulation order, a first size of a transport block, and a first number of resource blocks per transport block according to an orthogonal frequency division multiplexing technology; reducing means configured to reduce a first size per resource block, being the quotient of the first size of the transport block and the first number of resource blocks per transport block, based on the scaling number, thus obtaining a second size per resource block, being the quotient of a second size of the transport block and a second number of resource blocks per transport block; and assigning means configured to assign the second size of the transport block and the second number of resource blocks to the sequence of resource blocks.

Implementations of any of the above described blocks, apparatuses, systems, techniques or methods include, as non limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus, comprising
at least one processor, and
at least one memory including computer program code,
wherein the at least one memory and the computer code are configured, with the at least one processor, to cause the apparatus to at least perform the following:
observing an indication about the coverage status of a user equipment;
deciding, based on the indication, to switch into a coverage extension mode;
providing a scaling number in dependence of the coverage extension mode;
allocating, for data to be transmitted to a user equipment, a first modulation and coding scheme, a first modulation order, a first size of a transport block, and a first number of resource blocks per transport block according to an orthogonal frequency division multiplexing technology;
reducing a first size per resource block, being the quotient of the first size of the transport block and the first number of resource blocks per transport block, based on the scaling number, thus obtaining a second size per resource block, being the quotient of a second size of the transport block and a second number of resource blocks per transport block; and scheduling, for the data, the second size of the transport block and the second number of resource blocks per transport block.

2. The apparatus according to claim 1, wherein reducing comprises dividing the first size of the transport block by the scaling number to obtain the second size of the transport block.

3. The apparatus according to claim 1, wherein reducing comprises multiplying the first number of resource blocks per transport block with the scaling number to obtain the second number of resource blocks per transport block.

4. The apparatus according to claim 1, wherein the indication is a link quality of the user equipment.

5. The apparatus according to claim 1, wherein the at least one memory and the computer code are further configured, with the at least one processor, to cause the apparatus to at least perform the following: transmitting an information about the coverage extension mode.

6. The apparatus according to claim 5, wherein transmitting further comprises transmitting the information via radio resource control signaling.

7. The apparatus according to claim 5, wherein transmitting further comprises transmitting the indication.

8. An apparatus according to claim 1, comprising a base station configured to provide functionality according to the orthogonal frequency division multiplexing technology.

9. An apparatus, comprising
at least one processor, and
at least one memory including computer program code, wherein the at least one memory and the computer code are configured, with the at least one processor, to cause the apparatus to at least perform the following:
extracting, for a sequence of resource blocks, a scaling number, a modulation and coding scheme, a first modulation order, a first size of a transport block, and a first number of resource blocks per transport block according to an orthogonal frequency division multiplexing technology;
reducing a first size per resource block, being the quotient of the first size of the transport block and the first number of resource blocks per transport block, based on the scaling number, thus obtaining a second size per resource block, being the quotient of a second size of the transport block and a second number of resource blocks per transport block; and
assigning the second size of the transport block and the second number of resource blocks to the sequence of resource blocks.

10. The apparatus according to claim 9, wherein reducing comprises dividing the first size of the transport block by the scaling number to obtain the second size of the transport block.

11. The apparatus according to claim 9, wherein reducing comprises multiplying the first number of resource blocks per transport block with the scaling number to obtain the second number of resource blocks per transport block.

12. The apparatus according to claim 9, wherein the at least one memory and the computer code are further configured, with the at least one processor, to cause the apparatus to at least perform the following: receiving an information about the scaling number.

13. The apparatus according to claim 12, wherein receiving further comprises receiving the information via radio resource control signaling.

14. An apparatus according to claim 9, comprising a user equipment configured to provide functionality according to the orthogonal frequency division multiplexing technology.

15. A method, comprising
observing an indication about the coverage status of a user equipment;
deciding, based on the indication, to switch into a coverage extension mode;
providing a scaling number in dependence of the coverage extension mode;
allocating, for data to be transmitted to a user equipment, a first modulation and coding scheme, a first modulation order, a first size of a transport block, and a first number of resource blocks per transport block according to an orthogonal frequency division multiplexing technology;
reducing a first size per resource block, being the quotient of the first size of the transport block and the first number of resource blocks per transport block, based on the scaling number, thus obtaining a second size per resource block, being the quotient of a second size of the transport block and a second number of resource blocks per transport block; and
scheduling, in the coverage extension mode, for the data, the second size of the transport block and the second number of resource blocks per transport block.

16. The method according to claim 15, wherein the reducing is performed by dividing the first size of the transport block by the scaling number to obtain the second size of the transport block.

17. The method according to claim 15, wherein the reducing is performed by multiplying the first number of resource blocks per transport block with the scaling number to obtain the second number of resource blocks per transport block.

18. The method according to claim 15, wherein the indication is a link quality of the user equipment.

19. The method according to claim 15, further comprising transmitting an information about the coverage extension mode.

20. The method according to claim 19, wherein the transmitting is performed by transmitting the information via radio resource control signaling.

21. The method according to claim 19, wherein the transmitting means is performed by transmitting the indication.

22. A method, comprising
extracting, for a sequence of resource blocks, a scaling number, a modulation and coding scheme, a first modulation order, a first size of a transport block, and a first number of resource blocks per transport block according to an orthogonal frequency division multiplexing technology;
reducing a first size per resource block, being the quotient of the first size of the transport block and the first number of resource blocks per transport block, based on the scaling number, thus obtaining a second size per resource block, being the quotient of a second size of the transport block and a second number of resource blocks per transport block; and
assigning the second size of the transport block and the second number of resource blocks to the sequence of resource blocks.

23. The method according to claim 22, wherein the reducing is performed by dividing the first size of the transport block by the scaling number to obtain the second size of the transport block.

24. The method according to claim 22, wherein the reducing is performed by multiplying the first number of resource blocks per transport block with the scaling number to obtain the second number of resource blocks per transport block.

25. The method according to claim 22, further comprising receiving an information about the scaling number.

26. The method according to claim 25, wherein the receiving is performed by receiving the information via radio resource control signaling.

27. A computer program product embodied on a non-transitory computer-readable medium, comprising program instructions which perform, when executed by a computer, instructions which result in controlling or carrying out the method according to claim 15.

* * * * *